Figure 1:
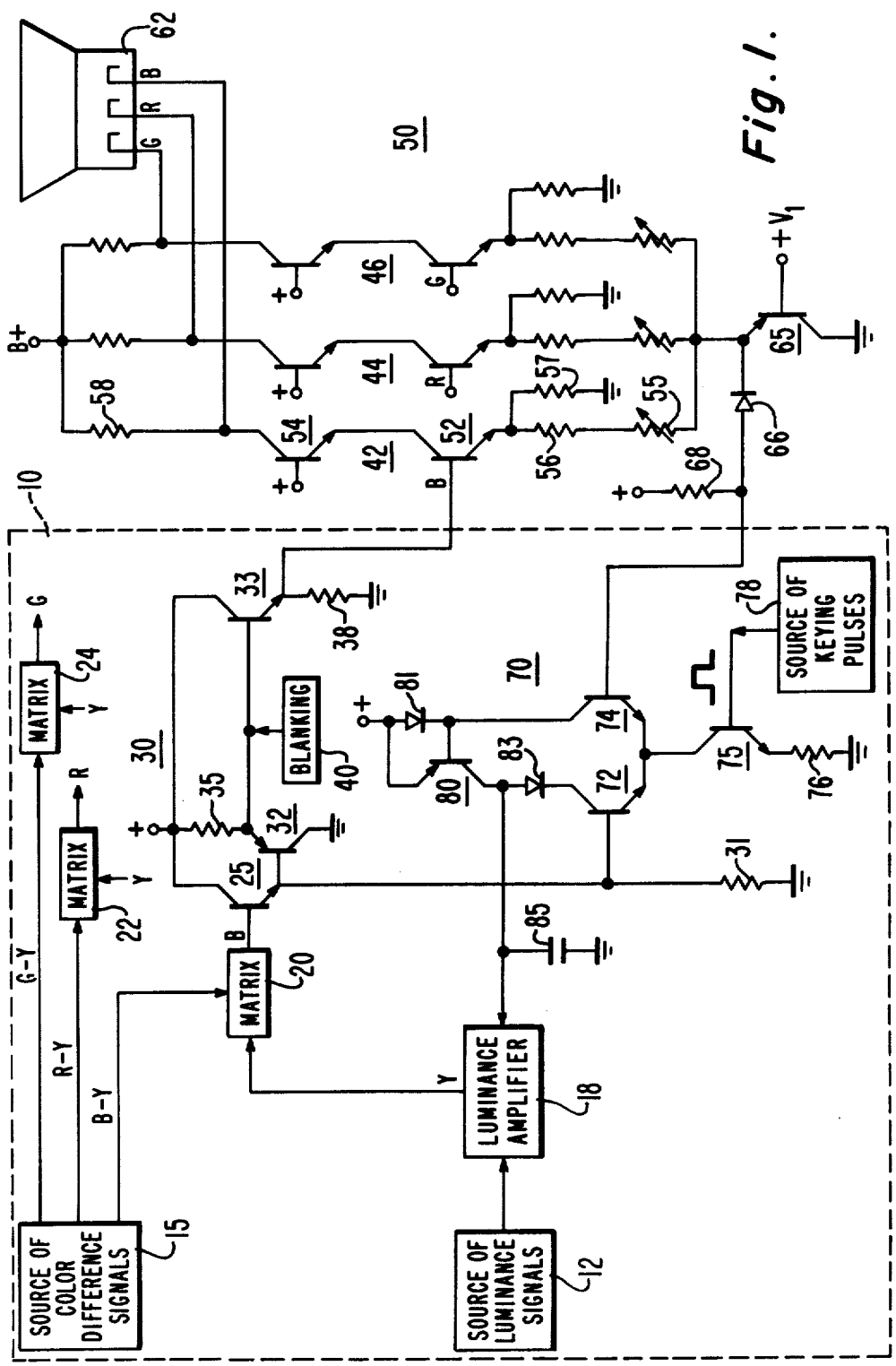

United States Patent [19]

Harwood et al.

[11] 4,203,131

[45] May 13, 1980

[54] PREDICTABLE AUTOMATIC BRIGHTNESS CONTROL CIRCUIT IN A VIDEO SIGNAL IMAGE REPRODUCING SYSTEM

[75] Inventors: Leopold A. Harwood, Bridgewater; Erwin J. Wittmann, North Plainfield, both of N.J.; Robert L. Shanley, II, Indianapolis, Ind.

[73] Assignee: RCA Corporation, New York, N.Y.

[21] Appl. No.: 8,050

[22] Filed: Jan. 31, 1979

[51] Int. Cl.² ............................................. H04N 5/16
[52] U.S. Cl. ...................................... 358/34; 358/168
[58] Field of Search .................... 358/34, 39, 40, 168

[56] References Cited

U.S. PATENT DOCUMENTS

| | | | |
|---|---|---|---|
| 2,930,843 | 3/1960 | Cooper | 178/5.4 |
| 3,588,341 | 6/1971 | Hansen | 178/7.5 DC |
| 3,597,540 | 8/1971 | MacIntyre, Jr. | 358/168 |

*Primary Examiner*—Robert L. Richardson

*Attorney, Agent, or Firm*—Eugene M. Whitacre; William H. Meagher; Ronald H. Kurdyla

[57] ABSTRACT

Brightness control apparatus for a video signal image reproducing system including a video signal processing channel, a kinescope driver for supplying video signals to an image reproducing kinescope, and a source of substantially fixed potential to which signals processed by the kinescope driver are referenced. A comparator senses the substantially fixed reference potential and a blanking level which occurs during periodic blanking intervals of the video signal, and provides an output control signal indicative of the voltage difference between the reference potential and the blanking level. The control voltage is applied to the video channel for translating the blanking level in a direction to minimize the voltage difference, to thereby establish the conduction of the kinescope driver during image intervals of the video signal at a level corresponding to a desired image black level condition when such condition is manifested by the video signal.

13 Claims, 2 Drawing Figures

PREDICTABLE AUTOMATIC BRIGHTNESS CONTROL CIRCUIT IN A VIDEO SIGNAL IMAGE REPRODUCING SYSTEM

This invention concerns an automatic brightness control circuit for use in a television receiver or equivalent system including an image reproducing kinescope, and particularly to such a circuit capable of establishing a predictable, desired level of image brightness without need of a viewer adjustable brightness control to compensate for deviations of image brightness from a desired level.

Image brightness information of a composite video signal such as a television signal is defined by the D.C. level of the luminance component of the video signal. A brightness reference level which approximates a black level of a reproduced image is contained in a blanking level of the luminance component.

In order to ensure that a reproduced image will exhibit a proper brightness level in response to video signal information, television receivers commonly include provision for adjusting the bias of the kinescope to simulate a "black level" condition corresponding to the black level defined by the video signal. Specifically, set-up adjustment of the kinescope in a service mode of the receiver requires that a reference voltage independent of the video signal be provided to allow the kinescope conduction to be adjusted to a level corresponding to the desired black level. Such kinescope set-up adjustment is well known and serves to ensure that the kinescope is properly blanked or cut-off in response to the blanking reference level of the video signal, or in the absence of signal.

Thus, two reference voltages are typically associated with establishing the desired image black level (and thereby image brightness), namely, the blanking reference level of the video signal and the reference voltage employed during kinescope service set-up to facilitate kinescope bias adjustment. In order to ensure that the reproduced image will exhibit a proper brightness level when the receiver operates in a normal mode, it is desirable that the reference voltage used to establish the kinescope blanking level during service adjustment and the video signal blanking reference level produce substantially the same results with respect to the reproduced images. However, both of these reference voltages are subject to deviations from an expected value due to tolerance variations or variations of the operating characteristics of associated circuits due to voltage drift caused by temperature or supply voltage changes, for example.

Although image brightness variations caused by these factors can be compensated for by means of a manually adjustable, viewer operated brightness control, manual readjustment of image brightness can be time-consuming and inconvenient, and therefore undesirable. The need for an adjustable brightness control would be minimized by reducing the likelihood of such undesired brightness variations occurring to an acceptable minimum. Under these circumstances the absence of an adjustable brightness control would represent little or no inconvenience to the viewer, and would additionally represent a cost saving.

Automatic brightness control apparatus in accordance with the present invention is included in a video signal processing system comprising a video signal channel for processing an image representative video signal having periodically recurring image intervals, and blanking intervals disposed between adjacent image intervals and containing a blanking level determinative of image brightness. A video amplifier is also included for coupling video signals from the video channel to an image reproducing kinescope. The video amplifier is provided with a substantially fixed reference potential to which signals amplified by the video amplifier are referenced. The brightness control apparatus includes a comparator having a first input coupled to a fixed reference voltage derived from the video amplifier reference potential, and a second input coupled to the video signal channel. The comparator compares the reference voltage and the video signal during the blanking intervals to provide an output control signal indicative of the difference in magnitude between the reference voltage and the video signal blanking level. The control signal is applied to the video channel for varying the blanking level of the video signal in a direction to reduce the difference in magnitude between the reference voltage and blanking level to a minimum.

Figure 2:
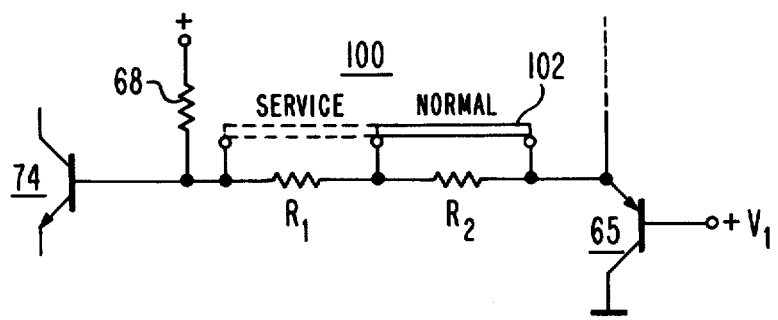
Figure 3:
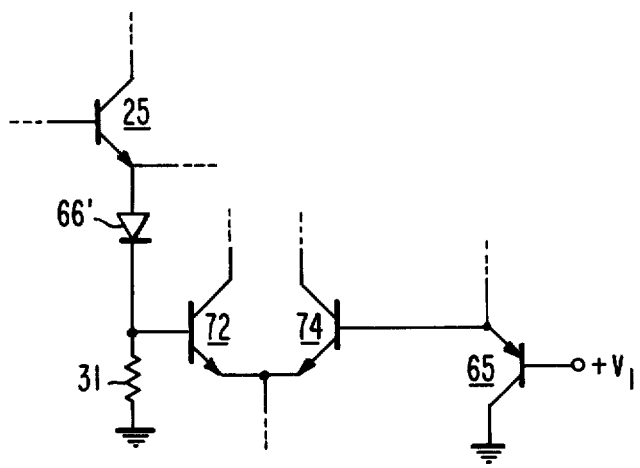

In the drawing,

FIG. 1 is a diagram partially in block form and partially in schematic diagram form of a portion of a color television receiver employing apparatus in accordance with the present invention; and FIGS. 2 and 3 depict alternate arrangements of apparatus according to the present invention.

In FIG. 1, a block 10 comprises a portion of luminance and chrominance signal processing networks included in a color television receiver. A luminance component of a composite color television signal is supplied from a source 12 to a luminance amplifier 18 (e.g., a differential amplifier), which amplifies and otherwise processes the luminance component to provide an amplified luminance signal Y. Color difference signals B-Y, R-Y and G-Y are supplied from a source 15 to respective matrix networks 20, 22 and 24 where the color difference signals are combined with the amplified luminance signal Y to produce B, R and G color image representative signals. The signals provided by sources 12 and 15 are derived from the composite color television signal in accordance with known techniques and conventional circuits (not shown).

The B, R and G signals are coupled from signal processing block 10 to a kinescope driver 50 including individual driver stages 42, 44 and 46 which respectively supply amplified B, R and G signals to intensity control electrodes (i.e., cathodes) of a color kinescope 62. Specifically, the B signal from matrix 20 is D.C. coupled to driver stage 42 via an emitter follower transistor 25, and a "zero offset" buffer stage 30 including opposite conductivity type follower transistors 32, 33 and associated bias resistors 35, 38, all arranged as shown. The emitter electrode of follower transistor 25 is returned to ground via a bias resistor 31. A source of blanking pulses 40 coupled to a base input of transistor 33 provides negative-going periodic pulses during image blanking (retrace) intervals to inhibit conduction of transistor 33 and to thereby decouple signal B from kinescope driver stage 42 during each image blanking interval.

Driver stage 42 comprises a video amplifier including a low power transistor 52 arranged in cascode video amplifier configuration with an upper-rank, high voltage common base transistor 54 having a collector load resistor 58. The emitter circuit of transistor 52 includes a variable resistor 55 for setting the signal gain of stage 42 during kinescope adjustment, an associated resistor 56, and a bias resistor 57 shunting the emitter of transistor 52 to ground. Signal B is coupled from the emitter output of transistor 33 to the base input of transistor 52 of stage 42, and appears in amplified form across load resistor 58 from which signal B is D.C. coupled to the B signal cathode of kinescope 62.

Driver stages 44 and 46 are arranged in the same manner as driver stage 42, and respectively receive the R and G signals from matrix networks 22 and 24 via associated circuits in the same manner as discussed with regard to signal B and driver stage 42, for supplying amplified R and G signals to the R and G signal cathodes of kinescope 62.

Kinescope driver 50 also includes a grounded collector PNP transistor 65 with a base electrode coupled to a source of bias potential $+V_1$ (e.g., $+3.3$ volts), and an emitter coupled to the emitter circuit of each lower rank transistor (e.g., transistor 52) of driver stages 42, 44 and 46. The emitter potential of transistor 65 (e.g., $+4.0$ volts) represents a reference voltage to which the video signals amplified by the driver stages are referenced, and is utilized to establish a desired image black level as will be discussed.

Block 10 also includes a high gain, keyed differential comparator circuit 70 including signal sampling transistors 72, 74 arranged in emitter coupled differential amplifier configuration. Operating currents for transistors 72 and 74 are supplied from a current source comprising a transistor 75 and an associated emitter resistor 76. Transistor 75 is keyed to conduct in response to positive, periodic pulses supplied from a source 78 and occurring during the so-called "back porch" interval (i.e., the burst interval) of each horizontal image line blanking interval. A transistor 80 and a diode 81 arranged as shown form an active load for sampling transistors 72, 74.

An average responding capacitor 85 coupled to the junction of the collector output of transistor 80 and a diode 83 serves to store (i.e., "hold") charge representative of signal information sampled by comparator 70. Diode 83 in the collector circuit of transistor 72 serves to prevent the normally reverse biased collector-base junction of transistor 72 from becoming forward biased and thereby disrupting the sampling function of comparator 70.

Comparator 70, luminance amplifier 18, matrix network 20 and follower transistor 25 form a closed control loop (i.e., a servo loop) for maintaining a substantially fixed relationship between the base voltage of comparator transistor 74 and the brightness determining blanking level of color signal B from matrix 20. For this purpose, comparator 70 and capacitor 85 are arranged as a "sample and hold" network wherein "sampling" of signal B occurs during the back porch portion of each image blanking interval when transistor 75 is keyed to conduct, and "holding" occurs during the remainder of each horizontal image line cycle. The operation of this closed control loop as well as the associated circuits are described in detail in a copending U.S. patent application of A. V. Tuma, et al., Ser. No. 794,128 entitled "Brightness Control Circuit Employing A Closed Control Loop," and in a copending U.S. patent application of L. A. Harwood, et al., Ser. No. 888,932 entitled "Automatic Brightness Control Circuit Employing A Closed Control Loop Stabilized Against Disruption By Large Amplitude Video Signals."

Briefly, when transistor 75 is keyed "on," comparator 70 compares the base voltage of transistor 74 with the voltage then appearing on the base of transistor 72 (corresponding to the brightness representative blanking level of signal B then appearing at the emitter of transistor 25). If an imbalance exists between these voltages, by differential action comparator 70 causes a control signal to be developed on capacitor 85 of a magnitude and direction to reduce the imbalance toward zero such that the difference between the base voltages of transistors 72 and 74 approaches zero (i.e., zero error). In this regard, it is noted that the burst information has been removed from signal B, so that the sampled portion of signal B includes only the brightness representative blanking level of signal B.

Illustratively, the blanking level of signal B can undesirably drift to a more positive level corresponding to increased brightness, thereby causing the base voltage of transistor 72 to increase relative to the base voltage of transistor 74. The collector current and collector voltage of transistor 72 then increase and decrease, respectively, relative to the collector current and voltage of transistor 74 by virtue of the differential action of comparator 50 during the keying interval. The relatively increased collector voltage of transistor 74 is in a direction to bias PNP transistor 80 for reduced current conduction. A charge otherwise appearing across capacitor 85 is depleted (discharged) via the collector-emitter current path of transistor 72 in proportion to the level of conduction of transistor 72. This in turn causes the blanking level of luminance signal Y at the output of amplifier 18, and accordingly the blanking level of signal B sensed at the base of transistor 72, to also decrease a corresponding amount. The reduction of the blanking level is in a direction to reduce the potential difference between the base electrode of comparator transistors 72, 74 toward zero, corresponding to the desired relationship.

The base voltage of transistor 74 represents a reference voltage equal to the sum of the reference voltage developed at the emitter of transistor 65 and the voltage drop across a forward biased diode 66 (0.7 volts) coupled between the base of comparator transistor 74 and the emitter of transistor 65. A current source including a source of positive direct potential (+) and a resistor 68 maintains diode 66 in a forward biased condition and also supplies emitter bias current for transistor 65. In this example, diode 66 represents an impedance which serves to compensate for the base-emitter offset voltage of driver transistor 52 by developing an offset voltage equal to the base-emitter junction offset voltage of driver transistor 52. More specifically, diode 66 provides a D.C. offset voltage equal to the (single) D.C. voltage offset between the emitter of transistor 25 (the point at which signal B is sensed by comparator 70) and the emitter of driver transistor 52.

During each horizontal blanking interval of the video signal (which includes the sampling interval), pulses from blanking unit 40 serve to inhibit the conduction of transistor 33. Therefore, the video signal is decoupled from driver transistor 52, and no signal induced currents flow through resistors 55 and 56 in the emitter circuit of driver transistor 52. In this example, the absence of current flow in resistors 55 and 56 corresponds to a black level condition. This black level condition should also be produced during each horizontal image interval of the video signal when the video signal equals the blanking level which occurs during the back-porch interval, since this blanking level essentially corresponds to the black level of a reproduced image. The brightness level of a reproduced image will be accurately established when the latter condition is satisfied. The closed control loop including comparator 70, amplifier 18, matrix 20 and transistor 25 serves to accomplish this result.

Since the closed control loop maintains the base voltages of comparator transistors 72, 74 substantially equal as discussed previously, the black level of signal B appearing at the emitter of follower transistor 25 and at the base of comparator transistor 72 during the keying interval equals the reference voltage developed at the base of comparator transistor 74. Therefore, during image intervals when the video signal level equals the blanking or black level, the base voltage of comparator transistor 74 also equals the base voltage of driver transistor 52, since the buffer network including transistors 32 and 33 does not produce a D.C. offset voltage. Also, the emitter voltage of driver transistor 52 equals the emitter reference voltage of transistor 65, due to the equal voltage drops associated with the base-emitter junction of transistor 52 and diode 66, respectively.

The image black level condition described above produces a zero potential difference across resistors 55 and 56 in the emitter circuit of transistor 52 and, consequently, substantially no current flows through these resistors at this time. This result corresponds to the desired zero drive signal condition for proper reproduction of image black levels, and is maintained for each of the B, R and G signals amplified by the respective driver stages due to the action of the closed control loop with respect to luminance signal Y which is matrixed with each of the color difference signals. Also as a result of this action, deviations of the reference voltage at the emitter of transistor 65 from a nominal value do not upset the image black level condition, whereby the image black level is predictably maintained from receiver to receiver.

Thus the desired kinescope driver black level condition is predictably achieved by utilizing only a single reference voltage derived from the kinescope driver network. An additional reference voltage such as is typically used in conjunction with service adjustment of the bias of the kinescope drivers is not required and, accordingly, a connection is not required from the service switch to the kinescope drivers for the purpose of developing or applying the kinescope reference voltage during the receiver service mode (e.g., by opening the kinescope driver main current conduction path to the kinescope to simulate the absence of signal). Also, a brightness control is not required to compensate for deviations between the kinescope black level established during kinescope set-up and signal black level experienced during normal operation of the receiver.

In this example, only the signal B is sampled by comparator 70. The R and G signals can also be sampled in the same manner, although this should not be necessary when the B, R and G signals as applied to the respective inputs of driver stages 42, 44 and 46 closely track with each other (e.g., with respect to temperature and power supply variations). This condition exists, for example, when the circuits providing the B, R and G signals to the kinescope drivers are fabricated on a single integrated circuit. In this connection, it is noted that the networks included within block 10 in FIG. 1, with the possible exception of capacitor 85, are capable of being fabricated as a single monolithic integrated circuit.

Also, the lower rank driver transistors (e.g., transistor 52 of stage 42) are lower power devices which can be easily matched with respect to operating characteristics.

In some systems it may be desirable to establish a black level condition (e.g., "blacker than black" bias) for the kinescope driver stages during kinescope adjustment which differs from the black level zero drive signal condition discussed above. Such an arrangement can be provided as shown in FIG. 2.

In FIG. 2, a pair of resistors $R_1$ and $R_2$ of different values are serially arranged between the base input of comparator transistor 74 and the emitter of transistor 65. A service switch 100 including a low impedance conductive member 102 and having "service" and "normal" positions is employed to switch either resistor $R_1$ or resistor $R_2$ between the emitter of transistor 65 and the base of transistor 74 during the receiver "normal" and "service" (i.e., kinescope adjustment) modes, respectively. Since these resistors exhibit different values, different offset voltages will be developed between the emitter of transistor 65 and the base of transistor 74 when switch 100 is placed in the "normal" and "service" positions to establish a desired black level condition in each instance. The values of resistor $R_1$ can be selected to develop a voltage drop in the "normal" mode substantially equal to the voltage drop provided by diode 66 in FIG. 1, while the value of resistor $R_2$ can be chosen to develop a slightly greater or lesser voltage drop in the "service" mode. The black level condition provided in this manner is as predictable as that established by the arrangement of FIG. 1, since the black level condition is still a function of a single reference voltage provided at the emitter of transistor 65. In practice, service switch 100 also includes provision for decoupling the luminance and chrominance signals from the kinescope, and for disabling vertical deflection of the kinescope, as known.

Although the invention has been described with reference to particular embodiments, various additional modifications can be made within the scope of the invention.

For example, the compensating impedance represented by diode 66 in FIG. 1 could instead be replaced by a diode 66' coupled and poled for forward current conduction between the emitter of transistor 25 and the base input of comparator transistor 72, as shown in FIG. 3. In this instance the emitter of transistor 65 is directly connected to the base of transistor 74 such that the base voltage of transistor 74 corresponds to the emitter reference potential of transistor 65. In addition, diode 66 can be replaced by a resistor of appropriate value, as indicated by the arrangement of FIG. 2, and transistor 65 can be replaced by a zener diode for providing the reference potential.

What is claimed is:

1. In a video signal processing system including a video signal channel for processing an image representative video signal having periodically recurring image intervals, and blanking intervals disposed between adjacent image intervals and containing a blanking level determinative of image brightness; a kinescope for reproducing images in response to video signals applied thereto; and kinescope amplifier means for coupling video signals from said channel to said kinescope; automatic brightness control apparatus comprising:

comparator means having first and second inputs for comparing, during said blanking intervals, signals applied to said inputs to provide an output control signal indicative of the difference in magnitude between the input signals;

means coupled to said kinescope amplifier means for providing a substantially fixed reference potential to which video signals amplified by said kinescope amplifier means are referenced;

means for coupling a substantially fixed reference voltage derived from said reference potential to said first input of said comparator means;

means for coupling video signals from said channel to said second input of said comparator means; and means for coupling said output of said comparator means to said channel, for varying said blanking level in a direction to reduce the difference between said derived input reference voltage and the blanking level of said input video signal to a minimum.

2. Apparatus according to claim 1, wherein:
said second input of said comparator means is coupled to said video channel at a first point for sensing said blanking level; and
said control signal is coupled to a second point in said video channel prior to said first point to form a closed loop with said video channel.

3. Apparatus according to claim 2, wherein:
said kinescope amplifier means comprises an active current conducting device having an input terminal coupled to said video channel after said first point for receiving video signals processed by said channel, an output terminal coupled to said kinescope, and a common terminal, said output and common terminals defining a main current conduction path for said active device; and wherein
an impedance network couples said common terminal to said reference potential.

4. Apparatus according to claim 3, and further comprising:
means coupled to an input of said comparator means for compensating for voltage offsets between said point in said video channel to which said second comparator input is coupled and said common terminal of said kinescope amplifier device, such that a predetermined amount of current flows through said impedance network of said kinescope amplifier during said blanking intervals when the difference between said comparator inputs is a minimum.

5. Apparatus according to claim 4, wherein:
said compensating means provides an offset voltage such that the potential developed at said common terminal of said kinescope amplifier device substantially equals said reference potential during said blanking intervals when the difference between said comparator inputs is a minimum, whereby substantially no current then flows through said impedance network.

6. Apparatus according to claim 4, wherein:
said compensating means is coupled between said amplifier reference potential and said first comparator input such that said derived reference voltage corresponds to the sum of the offset voltage developed by said compensating means and said reference potential.

7. Apparatus according to claim 4, wherein:
said compensating means is coupled between said second comparator input and said point in said video channel to which said second comparator input is coupled; and said first comparator input is coupled to said amplifier reference potential such that said derived reference voltage applied to said first comparator input corresponds to said amplifier reference potential.

8. Apparatus according to claim 4, wherein:
said kinescope amplifier device comprises a transistor having a base input terminal, a collector output terminal and a common emitter terminal; and
said compensating means comprises semiconductor PN junction means.

9. Apparatus according to claim 8, wherein:
said comparator means comprises first and second transistors arranged in differential amplifier configuration; and
a charge storage device is coupled to an output electrode of one of said differential amplifier transistors for developing said control signal in response to the conduction of said first and second transistors during said blanking intervals.

10. In a color television receiver including a video signal transmission path for processing a color image representative video signal, said transmission path including a luminance channel for processing a luminance component of said video signal having periodically recurring image intervals and image blanking intervals disposed between adjacent image intervals and containing a blanking level determinative of image brightness, and a chrominance channel for processing a chrominance component of said video signal; means for combining signals processed by said luminance and chrominance channels; a kinescope for reproducing images in response to video signals applied thereto; and kinescope amplifier means for coupling combined video signals from said combining means to said kinescope; apparatus comprising:

a source of keying signals coincident with a portion of said blanking interval containing said blanking level;

comparator means responsive to said keying signals and having first and second inputs for comparing, during said portion of said blanking intervals, signals applied to said inputs to provide an output control signal indicative of the difference in magnitude between said input signals;

means coupled to said kinescope amplifier means for providing a substantially fixed reference potential to which signals amplified by said kinescope amplifier means are referenced;

means for coupling a substantially fixed reference voltage derived from said reference potential to said first input of said comparator means;

means for coupling output signals from said combining means to said second input of said comparator means; and means for coupling said output of said comparator means to said video signal transmission path, for varying said blanking level in a direction to reduce the difference between said derived input voltage and the blanking level of said input video signal to a minimum.

11. Apparatus according to claim 10, wherein:
said second input of said comparator means is coupled from said output of said combining means at a first point in said signal transmission path for sensing said blanking level; and said control signal is coupled to a second point in said signal transmission path prior to said first point to form a closed loop with said signal transmission path.

12. Apparatus according to claim 11, wherein: said control signal is coupled to said luminance channel.

13. Apparatus according to claim 11, wherein: said chrominance channel includes means for deriving color difference signals; and
said combining means combines said color difference signals and said luminance component to produce color image representative output video signals.

* * * * *